(12) United States Patent
Lee

(10) Patent No.: US 7,809,784 B2
(45) Date of Patent: Oct. 5, 2010

(54) APPARATUS AND METHOD FOR CALCULATION OF DIVISIONS AND SQUARE ROOTS

(75) Inventor: Dong-Gyu Lee, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 932 days.

(21) Appl. No.: 11/654,255

(22) Filed: Jan. 17, 2007

(65) Prior Publication Data

US 2007/0118584 A1 May 24, 2007

Related U.S. Application Data

(62) Division of application No. 10/262,449, filed on Oct. 1, 2002, now Pat. No. 7,185,040.

(30) Foreign Application Priority Data

Nov. 21, 2001 (KR) .................................. 01-72685

(51) Int. Cl.
*G06F 7/52* (2006.01)
(52) U.S. Cl. ...................................... 708/655; 708/656
(58) Field of Classification Search ................. 708/655, 708/656
See application file for complete search history.

(56) References Cited

U.S. PATENT DOCUMENTS

| 3,852,581 A | 12/1974 | Reynard et al. |
| 4,939,686 A | 7/1990 | Fandrianto |
| 5,132,925 A * | 7/1992 | Kehl et al. .................. 708/653 |
| 5,258,944 A | 11/1993 | Smith |
| 5,404,324 A | 4/1995 | Colon-Bonet |
| 5,798,955 A | 8/1998 | Matsubara |
| 5,818,745 A | 10/1998 | Sheaffer |
| 5,870,323 A * | 2/1999 | Prabhu et al. ............... 708/650 |
| 6,108,682 A | 8/2000 | Matheny |
| 6,847,985 B1 | 1/2005 | Gupta et al. |

FOREIGN PATENT DOCUMENTS

EP 0450754 B1 5/1999

OTHER PUBLICATIONS

McQuillan, S.E., et al., "New Algorithms and VLSI Architectures for SRT Division and Square Root", IEEE, 1993, pp. 80-86.

* cited by examiner

*Primary Examiner*—Chuong D Ngo
(74) *Attorney, Agent, or Firm*—Mills & Onello, LLP

(57) ABSTRACT

Non-restoring radix-2 division and square rooting procedures are provided. The proposed procedures utilize a quotient/root digit set $\{-1, 0, +1\}$ and a quotient/root prediction table (QRT/RPT). The i'th quotient/root digit is determined with reference to a partial remainder from (i−2)'th iterative operation and by the quotient/root prediction table. The present procedures generate the (i−1)'th correction term, which is to be applied in calculating the i'th partial remainder, simultaneously with the (i−2)'th correction term, and need not to perform an iterative operation to obtain the i'th partial remainder.

10 Claims, 1 Drawing Sheet

APPARATUS AND METHOD FOR CALCULATION OF DIVISIONS AND SQUARE ROOTS

This application is a divisional of U.S. application Ser. No. 10/262,449, filed on Oct. 1, 2002, now U.S. Pat. No. 7,185,040, which relies for priority upon Korean Patent Application No. 10-2001-0072685, filed on Nov. 21, 2001, the contents of which are herein incorporated by reference in their entirety.

FIELD OF THE INVENTION

The present invention is in the field of data processing and, more specifically, relates to an apparatus and method for executing division and square rooting operations at high speed.

BACKGROUND OF THE INVENTION

With a recent rapid growth in computer application environments that require complex mathematical computations, such as graphic rendering, computer-aided design (CAD), or digital signal processing (DSP), almost all high performance microprocessors may be required to support operations of floating-point addition, multiplication, division, square rooting, etc., on the basis of the IEEE 754-1985 floating-point standard.

In a typical data processing system, the division and square rooting operations may more infrequently happen than addition or multiplication. However, while addition or multiplication may require about 3 cycles of latency, the division and square rooting operations each may require more than 20 cycles of latency, which will considerably affect overall performance of a system at least from a latency point of view.

The most common division process is the SRT division process. The SRT is an acronym for Sweeney, Robertson, and Tocher, who proposed processes similarly characterized to those at the same period. The SRT division process enhances the operation speed of non-restoring division by admitting zero (0), as a quotient digit, with which there is no need of conducting addition/subtraction. The principle of the SRT division process can be applied to a square rooting operation. The structure of the SRT process is disclosed in detail in "Computer Arithmetic Algorithms and Hardware Design" of Oxford university Press 2000 by Behrooz Parhami.

It is easy to implement the traditional radix-2 SRT process in a is hardware structure, but a lot of iterations are necessary to obtain quotient/square-roots. To the contrary, the radix-4 SRT process is difficult to reduce to a hardware structure and has a longer delay time for each iterative operation, while it reduces the number of iterations to a half of the radix-2. U.S. Pat. No. 5,258,944 discloses a way of referring a lookup table to select a quotient at each iterative step by means of the radix-4 SRT process.

SUMMARY OF THE INVENTION

It is, therefore, an object of the present invention to provide an apparatus and method for executing fast operations of division and square rooting by means of a radix-2 arithmetic process.

The invention provides novel arithmetic processes of non-restoring radix-2 division and/or square rooting operations, which are kinds of modified radix-2 SRT processes and utilize the same quotient/root digit set {−1, 0, +1} as the conventional radix-2 SRT procedures. In particular, a novel quotient/root prediction table (QRT/RPT) is used for the modified radix-2 SRT process according to the present invention. By means of the quotient/root prediction table, the i'th quotient/root digit is determined with reference to the i'th partial remainder obtained from the (i−2)'th partial remainder. The present procedures generate the (i−1)'th correction term, which is to be applied in calculating the i'th partial remainder, simultaneously with the (i−2)'th correction term, and skip an iterative operation to obtain the i'th partial remainder.

The present radix-2 arithmetic processes reduce the time of iterative operations by a half of the conventional ones, without lengthening a delay time of each iterative operation.

In accordance with the invention, an apparatus for generating a quotient by dividing a dividend with a divisor is provided. The apparatus includes a first correction term generator for creating a first correction term and a second correction term generator for creating a second correction term. A first subtractor deducts the first correction term from a left-shifted value of an (i−2)'th partial remainder. A second subtractor deducts the second correction term from the left-shifted value of the (i−2)'th partial remainder. A carry propagation detector determines whether there is a borrow while calculating an (i−1)'th partial remainder. Quotient digit prediction means predicts an i'th quotient digit in response to an (i−1)'th quotient digit, the (i−2)'th partial remainder, and an output of the carry propagation detector. Selection means selects an alternative one of outputs of the first and second subtractors as an i'th partial remainder in response to the i'th quotient digit.

In another aspect, the invention is directed to an apparatus for providing a square root of a radicand by an iterative operation. The apparatus includes a root digit selector for selecting an (i−1)'th root digit from an (i−2)'th partial remainder. A first correction term generator creates a first correction term by means of an (i−2)'th partial square root and the (i−1)'th root digit. A second correction term generator creates a second correction term by means of an (i−1)'th partial square root. A third correction term generator creates a third correction term by means of the (i−1)'th partial square root. A first subtractor deducts the first and second correction terms from a left-shifted value of an (i−2)'th partial remainder. A second subtractor deducts the first and second correction terms from the left-shifted value of the (i−2)'th partial remainder. A carry propagation detector determines whether there is a borrow or a carry-in while calculating (i−1)'th partial remainder. Root digit prediction means predicts an i'th root digit in response to an (i−1)'th root digit, the (i−2)'th partial remainder, and an output of the carry propagation detector. Selection means selects an alternative one of outputs of the first and second subtractors as an i'th partial remainder in response to the i'th root digit.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
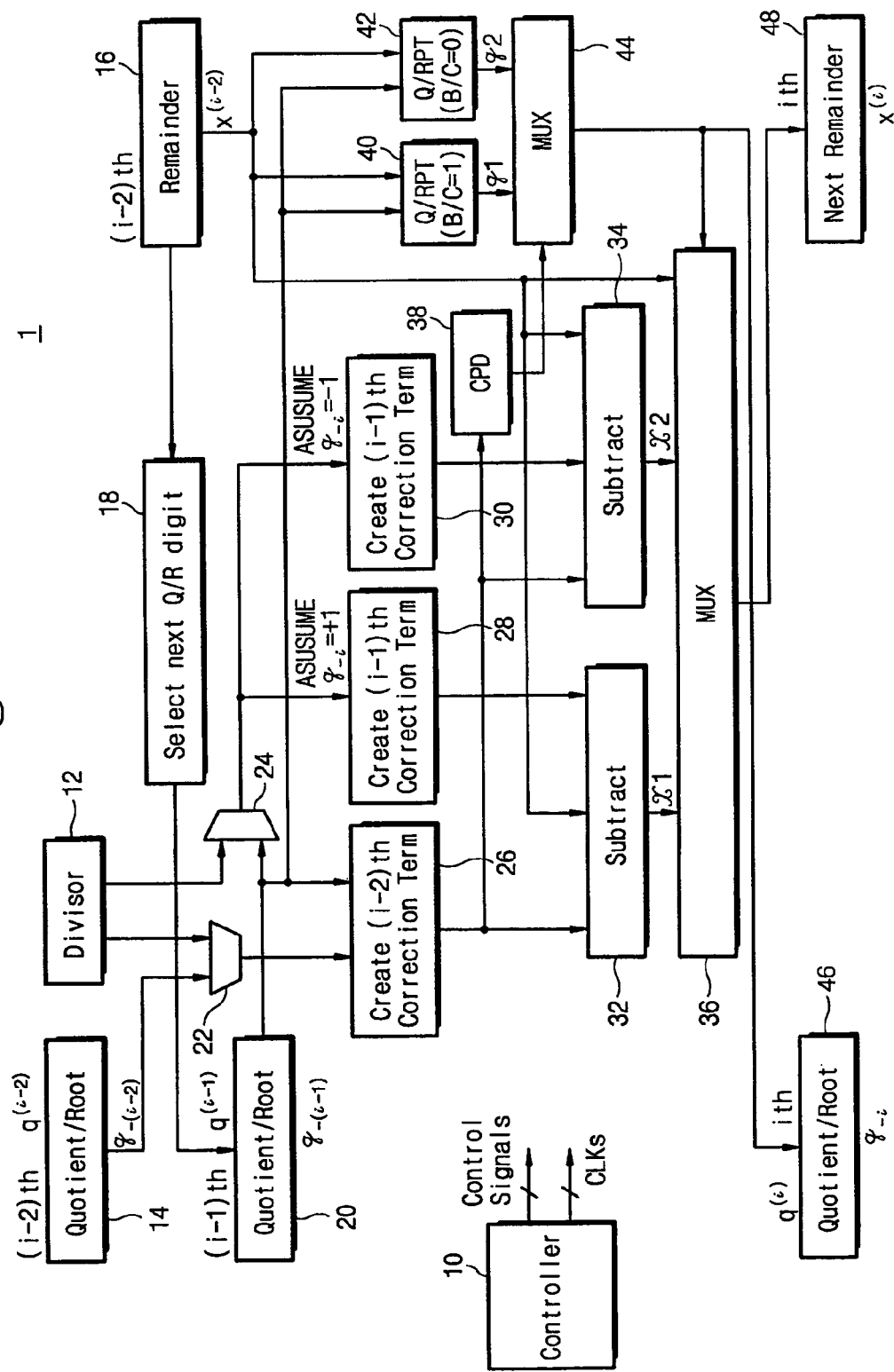
FIG. 1 is a functional block diagram of a division/square-root calculation apparatus according to the invention.

Now, a preferred embodiment of the invention will be described in conjunction with the FIG. 1.

I. Radix-2 Division Process Using Quotient Prediction Table (QPT)

The following is a notation for a floating point binary division process;

| | | |
|---|---|---|
| z | dividend | $z_0.z_{-1}z_{-2} \ldots z_{-2n}$ |
| d | divider | $0.d_{-1}d_{-2} \ldots d_{-n}$ |
| q | quotient | $1.q_{-1}q_{-2} \ldots q_{-n}$ |
| x | remainder | $x_0.x_{-1}x_{-2} \ldots x_{-2n}$ |

The expression of the remainder x, z−(d*q), is derived from the basic divisional equation z=(d*q)+x. The division process obtains quotient digits in sequence by means of partial remainders (PR).

The recurrence relation for the radix-2 division is summarized in the Equation 1 as follows:

$$x^{(i)} = 2x^{(i-1)} - q_{-i}*d \qquad \text{Equation 1}$$

In the Equation 1, $x^{(i)}$ is the i'th partial remainder, $x^{(i-1)}$ is the (i−1)'th partial remainder, $q_{-1}$ is the i'th quotient digit, d is a divisor, and $q_{-i}*d$ is the i'th correction term. From the Equation 1, the initiative partial remainder is $x^{(0)}=z$, $q_{-i} \in \{-1, 0, +1\}$.

Equation 1 may be reformed with the (i−2)'th partial remainder $x^{(i-2)}$, as follows;

$$x^{(i)} = 4x^{(i-2)} - (2q_{-(i-1)} + q_{-i})*d \qquad \text{Equation 2}$$

According to Equation 2, the i'th partial remainder $x^{(i)}$ results from the (i−1)'th quotient digit q−(i−1) and the divisor d. Therefore, Equation 2 shows that it is omissible for the (i−1)'th iterative operation, which is to obtain the (i−1)'th partial remainder $x^{(i-1)}$ necessary for deciding the i'th quotient digit $q_{-i}$, if the i'th quotient digit $q_{-i}$ subordinate to the (i−1)'th quotient digit $q_{-(i-1)}$ is settled therein.

With the present radix-2 division process employing the quotient digit set {−1, 0, +1}, the i'th quotient digit $q_{-i}$ necessary for obtaining the i'th partial remainder $x^{(i)}$ is established as follows by the level-shifted value $2x^{(i-1)}$ of the (i−1)'th partial remainder $x^{(i-1)}$;

If $2x^{(i-1)} < -\frac{1}{2}$, $q_{-i} = -1$.

If $-\frac{1}{2} \leq 2x^{(i-1)}$, $q_{-i} = 0$.

If $2x^{(i-1)} \geq \frac{1}{2}$, $q_{-i} = +1$.

After defining the (i−1)'th quotient digit $q_{-(i-1)}$, the i'th quotient digit $q_{-i}$ is correctly predicted with reference to the $q_{-(i-1)}$ without executing an iterative operation for the (i−1)'th partial remainder $x^{(i-1)}$. The prediction of the i'th quotient digit $q_{-i}$ uses a quotient prediction table (QPT). When a correction term of the (i−1)'th iteration is generated to calculate the (i−1)'th partial remainder $x^{(i-1)}$, the (i−2)'th correction term occurs simultaneously with the (i−1)'th correction terms for $q_{-i}=+1$ and for $q_{-i}=-1$. With the (i−2)'th correction term and the (i−1)'th correction terms for $q_{-i}=+1$ and for $q_{-i}=-1$, two conditional partial remainders, x1 and x2, are established, and then one of the conditional partial remainders is selected as $x^{(i)}$ in accordance with the i'th predicted quotient digit $q_{-i}$.

Next, described will be a procedure of predicting the i'th quotient digit $q_{-1}$.

To predict quotient digits, the divisor $d=0.1d_{-2}d_{-3}d_{-4} \ldots$ is considered.

The i'th quotient digit $q_{-i}$ prediction case 1: $d_{-2}=1$

If $x^{(i-2)} < \frac{1}{8}$, $q_{-(i-1)}=0$. As $-\frac{1}{2} < 2x^{(i-1)} < \frac{1}{4}$, $q_{-i}=0$. (1)

If $\frac{1}{8} \leq x^{(i-2)} < \frac{1}{4}$, $q_{-(i-1)}=0$. As $2x^{(i-1)} \geq \frac{1}{2}$, $q_{-i}=+1$. (2)

If $\frac{1}{4} \leq x^{(i-2)} < \frac{3}{8}$, $q_{-(i-1)}=+1$. $q_{-i}=-1$ when $2x^{(i-1)} < -\frac{1}{2}$ or $q_{-i}=0$ when $-\frac{1}{2} < x^{(i-1)} < \frac{1}{4}$. (3)

If $\frac{3}{8} \leq x^{(i-2)} < \frac{1}{2}$, $q_{-(i-1)}=+1$. As $-\frac{1}{2} \leq 2x^{(i-1)} < \frac{1}{2}$, $q_{-i=0}$. (4)

If $\frac{1}{2} \leq x^{(i-2)} < \frac{5}{8}$, $q_{-(i-1)}=-1$. As $-\frac{1}{2} \leq 2x^{(i-1)} < \frac{1}{2}$, $q_{-i}=0$. (5)

If $\frac{5}{8} \leq x^{(i-2)} < 3/4$, $q_{-(i-1)}=-1$. $q_{-i}=0$ when $-\frac{1}{2} \leq 2x^{(i-1)} < \frac{1}{2}$ or $q_{-i}=-1$ when $2x^{(i-1)} < -\frac{1}{2}$. (6)

If $3/4 \leq x^{(i-2)} < 7/8$, $q_{-(i-1)}=0$. As $2x^{(i-2)} < -\frac{1}{2}$, $q_{-i}=-1$. (7)

If $7/8 \leq x^{(i-2)} < 1$, $q_{-(i-1)}=0$. As $-\frac{1}{2} \leq 2x^{(i-1)} < \frac{1}{2}$ always, $q_{-i}=0$ (8)

The i'th quotient digit $q_{-i}$ prediction case: $d_{-2}=0$

As same as the former case of $d_{-2}=1$, it is understood that the value of $q_{-i}$ is predictable with reference to $q_{-(i-1)}$ obtained from each condition.

From the results, it is possible to make up quotient prediction tables (QPT) for predicting the i'th quotient digit $q_{-i}$ as shown in the following Tables 1 and 2. Table 1 arranges predicted values of the i'th quotient digit $q_{-i}$ in the case of $d=0.11d_{-3}d_{-4}$ (the $q_{-i}$ prediction case 1: $d_{-2}=1$), and Table 2 arranges predicted values of the i'th quotient digit $q_{-i}$ in the case of $d=0.10d_{-3}d_{-4}$ (the $q_{-i}$ prediction case 2: $d_{-2}=0$).

TABLE 1

The $q_{-i}$ prediction case 1: $d_{-2} = 1$

| (i − 2)'th partial remainder | (i − 1)'th quotient digit | (i − 1)'th partial remainder (borrow = 1) | i'th quotient digit | (i − 1)'th partial remainder (borrow = 0) | i'th quotient digit |
|---|---|---|---|---|---|
| 0.000 | 0 | 0.00 | 0 | 0.00 | 0 |
| 0.001 | 0 | 0.01 | +1 | 0.01 | +1 |
| 0.010 | +1 | 1.10 | −1 | 1.11 | 0 |
| 0.011 | +1 | 0.11 | 0 | 0.00 | 0 |
| 0.100 | −1 | 0.00 | 0 | 1.11 | 0 |
| 0.101 | −1 | 0.01 | +1 | 000.0 | 0 |
| 0.110 | 0 | 0.10 | −1 | 000.1 | −1 |
| 0.111 | 0 | 0.11 | 0 | 001.0 | 0 |

In Table 1, as the divisor $d=0.11d_{-3}d_{-4} \ldots$ when $x^{(i-2)}=0.010x_{-4}x_{-5} \ldots$, the (i−1)'th quotient digit $q_{-(i-1)}$ becomes "+1". If a borrow occurs (borrow=1) at the calculation step for the (i−1)'th partial remainder $x^{(i-1)}$, the i'th quotient digit $q_{-i}$ is set to "−1". If there is no borrow (borrow=0) at the step for the (i−1)'th partial remainder $x^{(i-1)}$, the i'th quotient digit $q_{-i}$ becomes "0".

TABLE 2

The $q_{-i}$ prediction case 2: $d_{-2} = 0$

| (i − 2)'th partial remainder | (i − 1)'th quotient digit | (i − 1)'th partial remainder (borrow = 1) | i'th quotient digit | (i − 1)'th partial remainder (borrow = 0) | i'th quotient digit |
|---|---|---|---|---|---|
| 0.000 | 0 | 0.00 | 0 | 0.00 | 0 |
| 0.001 | 0 | 0.01 | +1 | 0.01 | +1 |
| 0.010 | +1 | 1.10 | +1 | 1.11 | 0 |
| 0.011 | +1 | 0.11 | −1 | 0.00 | 0 |
| 0.100 | −1 | 0.00 | 0 | 1.11 | −1 |
| 0.101 | −1 | 0.01 | 0 | 000.0 | 0 |
| 0.110 | 0 | 0.10 | −1 | 000.1 | −1 |
| 0.111 | 0 | 0.11 | 0 | 001.0 | 0 |

In Table 2, as the divisor $d=0.10d_{-3}d_{-4}\ldots$ when $x^{(i-2)}=0.110x_{-4}x_{-5}\ldots$, the (i−1)'th quotient digit $q_{-(i-1)}$ becomes "0". If a borrow occurs (borrow=1) at the calculation step for the (i−1)'th partial remainder $x^{(i-1)}$, the i'th quotient digit $q_{-i}$ is set to "−1". If there is no borrow (borrow=0) at the step for the (i−1)'th partial remainder $x^{(i-1)}$, the i'th quotient digit q−i becomes "0".

The following Tables 3 and 4 represent division results by the conventional Radix-2 SRT process and the present Radix-2 SRT process, respectively, in the case of the dividend x=0.01000101 and the divisor d=0.1010.

TABLE 3

The conventional non-restoring Radix-2 SRT division process

| z | 0.01000101 | |
|---|---|---|
| D | 0.1010 | |
| $x^{(0)}$ | 0.01000101 | |
| $2x^{(0)} + (-d)$ | 0.1000101<br>1.0110 | ≧½, so set $q_{-1} = +1$ |
| $x^{(1)}$ | 1.1110101 | [−½, ½], so set $q_{-2} = 0$ |
| $2x^{(1)}$ | 1.110101 | |
| $x^{(2)} = 2x^{(1)}$ | 1.110101 | |
| $2x^{(2)} + (d)$ | 1.10101<br>0.1010 | <−½, so set $q_{-3} = -1$ |
| $x^{(3)}$ | 0.10001 | |
| $2x^{(3)} + (-d)$ | 0.1001<br>1.0110 | ≧½, so set $q_{-4} = +1$ |
| $x^{(4)} - 2x^{(3)} + d$ | 1.1111<br>0.1010 | Negative, so add to correct |
| $x^{(4)}$ | 0.1001 | |
| x | 0.00001001 | |
| q | 0.10−11 | Uncorrected BSD quotient |
| q | 0.0110 | Covert and subtract ulp |

TABLE 4

The present non-restoring Radix-2 division process

| z | 0.01000101 | |
|---|---|---|
| D | 0.1010 | |
| $x^{(0)}$ | 0.01000101 | |
| $4x^{(0)} - (2d)$ | 0.000101<br>1.010 | ≧½, so set $q_{-1} = +1$,<br>so set $q_{-2} = 0$ |
| $X^{(1)}$ | 1.110101 | <−½, so set $q_{-3} = -1$, |
| $4x^{(1)} + d$ | 1.110101 | so set $q_{-4} = +1$ |
| $X^{(2)} + (d) + (-d)$ | 1.1111<br>1.10101<br>0.1010 | Negative, so add to correct |

TABLE 4-continued

The present non-restoring Radix-2 division process

| $X^{(4)}$ | 0.1001 | |
|---|---|---|
| x | 0.00001001 | |
| q | 0.10−11 | Uncorrected BSD quotient |
| q | 0.0110 | Covert and subtract ulp |

As shown in Table 4, the proposed process calculates the first quotient digit $q_{-1}$ from the initiative partial remainder $x^{(0)}$ in the first iterative operation, and then the quotient prediction table predicts the second quotient digit $q_{-2}$ with reference to the calculated $q_{-1}$ (refer that the conventional one obtains the $q_{-2}$ from the second iterative operation). Thereafter, the quotient digits $q_{-1}$ and $q_{-2}$ are applied to a calculating operation for the first partial remainder $x^{(1)}$. In the second iterative operation, the second quotient digit $q_{-3}$ is obtained from $x^{(1)}$, and then the quotient prediction table defines the fourth quotient digit $q_{-4}$ with reference to the settled $q_{-3}$ (refer that the convention $q_{-4}$ is obtained in the fourth iterative operation). Thereafter, the second partial remainder $x^{(2)}$ is established from the digits $q_{-3}$ and $q_{-4}$. As a result, since the proposed Radix-2 division process needs not performing the iterative operations for the first and third partial remainders, $x^{(1)}$ and $x^{(3)}$, it shortens the latency by a half of the conventional case. Additionally, the present process completes the whole division operation sooner than the conventional process does because each execution time of the iterative operations is the same with the conventional.

II. Radix-2 Square-rooting Arithmetic Process Using a Root Prediction Table (RPT)

The following is a notation of the present floating point binary square-rooting process;

| z | radicand | $z_1z_0.z_{-1}z_{-2}\ldots z_{-n}$ ($1 \leq z < 4$) |
|---|---|---|
| q | square root | $1.q_{-1}q_{-2}\ldots q_{-n}$ ($1 \leq q < 2$) |
| x | remainder | $x_1x_0.x_{-1}x_{-2}\ldots x_{-n}$ ($0 \leq x < 4$) |

The basic equation for the square-rooting operation is $z=q^2+x$. The SRT square-rooting operation process is to obtain the root digits $q_{-1}q_{-2}\ldots q_{-n}$ with the partial remainders.

The following is the circular equation for the Radix-2 square-rooting operation;

$$x^{(i)}=2x^{(i-1)}-(2q^{(i-1)}+q_{-i}2^{-i})q_{-i} \quad \text{Equation 3}$$

In Equation 3, $x^{(i)}$ and $x^{(i-1)}$ represent the i'th and (i−1)'th partial remainders, respectively, $q_{-i}$ is the i'th root digit, and $q^{(i-1)}$ is the (i−1)'th partial square root. The initiative partial remainder $x^{(0)}=z-1$, and $q_{-i} \in \{-1, 0, +1\}$.

Equation 3 may be converted into the following form for the (i−2)'th iterative operation;

$$x^{(i)}=4x^{(i-2)}-2(2q^{(i-2)}+q_{-(i-1)}2^{-i+1})q_{-(i-1)}-2(2q^{(i-1)}+q_{-i}2^{-i})q_{-i} \quad \text{Equation 4}$$

In Equation 4, $x^{(i-2)}$ is the (i−2)'th partial remainder, $q^{(i-2)}$ is the (i−2)'th partial square root, and $q_{-(i-1)}$ is the (i−1)'th root digit.

Equation 4 may also be summarized into the following form by substituting the term $2q^{(i-2)}+q_{-(i-1)}2^{-i+1}$ with $C^{(i-2)}$, and $2q^{(i-1)}+q_{-i}2^{-i}$ with $C^{(i-1)}$;

$$x^{(i)}=4x^{(i-1)}-2C^{(i-2)}q_{-(i-1)}-2C^{(i-1)}q_{-i} \quad \text{Equation 5}$$

That is, $C^{(i-2)}$ represents the (i−2)'th correction term, and $C^{(i-1)}$ is the i'th iterative correction term.

The square-rooting operation, as the division operation, selects a root digit by a partial remainder in each iterative operation, and obtains the next partial remainder by generating a correction term.

The proposed Radix-2 square-rooting process, as the present Radix-2 division process aforementioned, uses the set {−1, 0, +1} as a root digit set. The i'th root digit $q_{-i}$ is established by the (i−1)'th partial remainder $x^{(i-1)}$, as follows:

If $x^{(i-1)} < -½$, $q_{-i} = -1$.

If $-½ \leq x^{(i-1)} < ½$, $q_{-i} = 0$.

If $x^{(i-1)} \geq ½$, $q_{-i} = +1$.

The present process predicts the i'th root digit $q_{-i}$ with reference to four bits of the (i−2)'th partial remainder $x^{(i-2)}$. Simultaneously with generation of the (i−2)'th correction term $C^{(i-2)}$, the (i−1)'th correction term $C^{(i-1)}$ is generated to calculate the i'th partial remainder. While generating the (i−1)'th correction term $C^{(i-1)}$, correction terms for the case of the i'th root digit $q_{-i}=+1$ and −1 are preliminarily prepared. Two conditional partial remainders, x1 and x2, are calculated from the (i−1)'th root digit $q_{-(i-1)}$, the i'th root digit $q_{-i}$, the (i−2)'th correction term $C^{(i-2)}$, and the correction terms for the case of the i'th root digit $q_{-i}=+1$ and −1. And, one of the conditional partial remainders, x1 or x2, is selected as $x^{(i)}$ in accordance with the i'th root digit $q_{-i}$ settled finally.

Such a process in the proposed Radix-2 square-rooting process makes it possible to skip an iterative operation for the (i−1)'th partial remainder $x^{(i-1)}$. It shortens an iterative operation time by a half of the conventional Radix-2 SRT square-rooting process, and does not lengthen a delay time of each iterative operation, different from the conventional.

The prediction of root digits proceeds according to the following conditions, assuming that the radicand $z = z_2 z_1 z_0 . z_{-1} z_{-2} \ldots$ and the partial remainder $x^{(i)} = x_2 x_1 x_0 . x_{-1} x_{-2} \ldots$.

The i'th Root Digit Prediction Case 1: $z_{-1}=0$ and $x_2=0$

Under the initiative condition in which $q_{-(i-1)}$ is always 1 when $z_{-1}=0$ and $x_2=0$, If $0 \leq x^{(i-2)} < 1$, $x^{(i-1)} < -½$. Thus, $q_{-i} = -1$. (1)

If $1 \leq x^{(i-2)} < 5/4$ and $x^{(i-1)} < -½$, $q_{-i} = -1$. If $1 \leq x^{(i-2)} < 5/4$ and $-½ \leq x^{(i-1)} < ½$, $q_{-i} = 0$. (2)

If $5/4 \leq x^{(i-2)} < 3/2$ and $-½ \leq x^{(i-1)} < ½$, $q_{-i} = 0$.
If $5/4 \leq x^{(i-2)} < 3/2$ and $x^{(i-1)} \geq ½$, $q_{-i} = +1$. (3)

If $3/2 \leq x^{(i-2)} < 3$, $x^{(i-1)} \geq ½$. Thus, $q_{-i} = +1$. (4)

If $3 \leq x^{(i-2)} < 13/4$ and $x^{(i-1)} < -½$, $q_{-i} = -1$. If $3 \leq x^{(i-2)} < 13/4$ and $x^{(i-1)} \geq ½$, $q_{-i} = +1$. (5)

If $x^{(i-2)} \geq 13/4$, $x^{(i-1)} < -½$. Thus, $q_{-i} = -1$. (6)

The i'th root digit $q_{-1}$ prediction case 2: $z_{-1}=0$ and $x_2=1$

The $q_{-(i-1)}$ is always −1 when $z_{-1}=0$ and $x_2=1$. Under the initiative condition, it can be understood that the values of the root digits are obtained in the conditions the same with the former $q_{-i}$ prediction case 1: $z_{-1}=0$ and $x_2=0$.

From the above results, it is possible to make up root prediction tables (RPT) for predicting the i'th root digit $q_{-i}$ as shown in the following Tables 5 and 6. Table 5 shows predicted values of the i'th root digit $q_{-i}$ in the case of the radicand $z = z_2 z_1 z_0 . 0 z_{-2} \ldots$ and the partial remainder $x^{(i)} = 0 x_1 x_0 . x_{-1} x_{-2} \ldots$ (the $q_{-i}$ prediction case 1: $z_{-1}=0$ and $X_2=0$), and Table 6 arranges predicted values of the i'th root digit $q_{-i}$ in the case of the radicand $z = z_2 z_1 z_0 . 0 z_{-2} \ldots$ and the partial remainder $x^{(i)} = 1 x_1 x_0 . x_{-1} x_{-2} \ldots$ (the $q_{-i}$ prediction case 2: $z_{-1}=0$ and $x_2=1$).

TABLE 5

The $q_{-i}$ prediction case 1: $z_{-1}=0$ and $x_2=0$

| | (i − 1)'th root digit = +1 | | | | | (i − 1)'th root digit = −1 | | | |
| --- | --- | --- | --- | --- | --- | --- | --- | --- | --- |
| (i − 2)'th partial rmd. | (i − 1)'th partial rmd. (borrow = 1) | i'th root digit | (i − 1)'th partial rmd. (borrow = 0) | i'th root digit | (i − 2)'th partial rmd. | (i − 1)'th partial rmd. (carry-in = 1) | i'th root digit | (i − 1)'th partial rmd. (carry-in = 0) | i'th root digit |
| 00.00 | 101.1 | −1 | 110.0 | −1 | 00.00 | 010.1 | +1 | 010.0 | +1 |
| 00.01 | 110.0 | −1 | 110.0 | −1 | 00.01 | 011.0 | +1 | 010.1 | +1 |
| 00.10 | 110.1 | −1 | 111.0 | −1 | 00.10 | 011.1 | +1 | 011.0 | +1 |
| 00.11 | 111.0 | −1 | 111.1 | −1 | 00.11 | 100.0 | −1 | 011.1 | +1 |
| 01.00 | 111.1 | −1 | 000.0 | 0 | 01.00 | 100.1 | −1 | 100.0 | −1 |
| 01.01 | 000.0 | 0 | 000.1 | +1 | 01.01 | 101.0 | −1 | 100.1 | −1 |
| 01.10 | 000.1 | +1 | 001.0 | +1 | 01.10 | 101.1 | −1 | 101.0 | −1 |
| 01.11 | 001.0 | +1 | 001.1 | +1 | 01.11 | 110.1 | −1 | 101.1 | −1 |
| 10.00 | 001.1 | +1 | 010.0 | +1 | 10.00 | 110.1 | −1 | 110.0 | −1 |
| 10.01 | 010.0 | +1 | 010.1 | +1 | 10.01 | 111.0 | −1 | 110.1 | −1 |
| 10.10 | 010.1 | +1 | 011.0 | +1 | 10.10 | 111.1 | −1 | 111.0 | −1 |
| 10.11 | 011.0 | +1 | 011.1 | +1 | 10.11 | 000.0 | 0 | 111.1 | −1 |
| 11.00 | 011.1 | +1 | 100.0 | −1 | 11.00 | 000.1 | +1 | 000.0 | 0 |
| 11.01 | 100.0 | −1 | 100.1 | −1 | 11.01 | 001.0 | +1 | 000.1 | +1 |
| 11.10 | 100.1 | −1 | 101.0 | −1 | 11.10 | 001.1 | +1 | 001.0 | +1 |
| 11.11 | 101.0 | −1 | 101.1 | −1 | 11.11 | 010.0 | +1 | 001.1 | +1 |

In Table 5, the (i−1)'th root digit $q_{-(i-1)}$ becomes "+1" or "−1" when the (i−2)'th partial remainder $x^{(i-2)} = 000.10x_{-3}x_{-4}\ldots$. When the (i−1)'th root digit $q_{-(i-1)}=+1$, the i'th root digit $q_{-i}$ is "−1" if a borrow occurs while calculating the (i−1)'th partial remainder $x^{(i-1)}$ (borrow=1). At this time, although there is no borrow while calculating the (i−1)'th partial remainder $x^{(i-1)}$ (borrow=0), the i'th root digit $q_{-i}$ will also be "−1". When the (i−2)'th partial remainder $x^{(i-2)} = 010.11x_{-3}x_{-4}$ and the (i−1)'th root digit $q_{-(i-1)}=-1$, the i'th root digit $q_{-i}$ is "0" if a carry-in occurs while calculating the (i−1)'th partial remainder $x^{(i-1)}$ (carry-in=1). At this time, although there is no carry-in while calculating the (i−1)'th partial remainder $x^{(i-1)}$ (carry-in=0), the i'th root digit $q_{-i}$ becomes "−1".

TABLE 6

The $q_{-i}$ prediction case 2: $z_{-1} = 0$ and $x_2 = 1$

| | (i − 1)'th root digit = +1 | | | | | (i − 1)'th root digit = −1 | | | |
|---|---|---|---|---|---|---|---|---|---|
| (i − 2)'th partial rmd. | (i − 1)'th partial rmd. (borrow = 1) | i'th root digit | (i − 1)'th partial rmd. (borrow = 0) | i'th root digit | (i − 2)'th partial rmd. | (i − 1)'th partial rmd. (carry-in = 1) | i'th root digit | (i − 1)'th partial rmd. (carry-in = 0) | i'th root digit |
| 00.00 | 101.0 | −1 | 101.1 | −1 | 00.00 | 011.1 | +1 | 010.1 | +1 |
| 00.01 | 110.1 | −1 | 110.0 | −1 | 00.01 | 011.0 | +1 | 011.0 | +1 |
| 00.10 | 110.0 | −1 | 110.1 | −1 | 00.10 | 011.1 | −1 | 011.1 | −1 |
| 00.11 | 110.1 | −1 | 111.0 | −1 | 00.11 | 100.0 | −1 | 100.0 | −1 |
| 01.00 | 111.0 | −1 | 111.1 | −1 | 01.00 | 100.1 | −1 | 100.1 | −1 |
| 01.01 | 111.1 | 0 | 000.0 | 0 | 01.01 | 101.0 | −1 | 101.0 | −1 |
| 01.10 | 000.0 | −1 | 000.1 | +1 | 01.10 | 101.1 | −1 | 101.1 | −1 |
| 01.11 | 000.1 | +1 | 001.0 | +1 | 01.11 | 110.0 | −1 | 110.0 | −1 |
| 10.00 | 001.0 | +1 | 001.1 | +1 | 10.00 | 110.1 | −1 | 110.1 | −1 |
| 10.01 | 001.1 | +1 | 010.0 | +1 | 10.01 | 111.0 | −1 | 111.0 | −1 |
| 10.10 | 010.0 | +1 | 010.1 | +1 | 10.10 | 111.1 | 0 | 111.1 | −1 |
| 10.11 | 010.1 | +1 | 011.0 | +1 | 10.11 | 000.0 | +1 | 000.0 | 0 |
| 11.00 | 011.0 | +1 | 011.1 | +1 | 11.00 | 000.1 | +1 | 000.1 | +1 |
| 11.01 | 011.1 | +1 | 100.0 | −1 | 11.01 | 001.0 | +1 | 001.0 | +1 |
| 11.10 | 100.0 | −1 | 100.1 | +1 | 11.10 | 001.1 | +1 | 001.1 | +1 |
| 11.11 | 101.1 | −1 | 101.0 | −1 | 11.11 | 010.0 | +1 | 010.0 | +1 |

From Table 6, the (i−1)'th root digit $q_{-(i-1)}$ becomes "+1" or "−1" when the (i−2)'th partial remainder $x^{(i-2)}=101.01x_{-3}x_{-4}\ldots$. When the (i−1)'th root digit $q_{-(i-1)}=+1$, the i'th root digit $q_{-i}$ is "−1" if a borrow occurs while calculating the (i−1)'th partial remainder $x^{(i-1)}$ (borrow=1). If there is no borrow while calculating the (i−1)'th partial remainder $x^{(i-1)}$ (borrow=0), the i'th root digit $q_{-i}$ will be "0". When the (i−2)'th partial remainder $x^{(i-2)}=110.11x_{-3}x_{-4}$ and the (i−1)'th root digit $q_{-(i-1)}=-1$, the i'th root digit $q_{-i}$ is "0" if a carry-in occurs while calculating the (i−1)'th partial remainder $x^{(i-1)}$ (carry-in=1). If there is no carry-in while calculating the (i−1)'th partial remainder $x^{(i-1)}$ (carry-in=0), the i'th root digit $q_{-i}$ becomes "0".

The following Tables 7 and 8 represent operation results from the conventional Radix-2 SRT square-rooting process and the present Radix-2 SRT square-rooting process, respectively, in the case of the radicand z=01.110110.

TABLE 7

The conventional non-restoring Radix-2 square-rooting process

| | | | |
|---|---|---|---|
| z | 01.110110 | | |
| $x^{(0)} = z − 1$ | 000.110110 | $q_0 = +1$ | $q^{(0)} = 1.$ |
| $2x^{(0)}$ | 001.101100 | $q_{-1} = +1$ | $q^{(1)} = 1.1$ |
| $-(2 * (1.) + 2^{-1})$ | 10.1 | | |
| $x^{(1)}$ | 111.001100 | $q_{-2} = -1$ | $q^{(2)} = 1.01$ |
| $2x^{(1)}$ | 110.01100 | | |
| $+(2 * (1.1) + 2^{-2})$ | 10.11 | | |
| $x^{(2)}$ | 001.001000 | $q_{-3} = +1$ | $q^{(3)} = 1.011$ |
| $2x^{(2)}$ | 010.010000 | | |
| $-(2 * (1.01) + 2^{-3})$ | 10.101 | | |
| $x^{(3)}$ | 111.101000 | $q_{-4} = -1$ | $q^{(4)} = 1.0101$ |
| $2x^{(3)}$ | 111.010000 | | |
| $+(2 * (1.011) - 2^{-4})$ | 10.1011 | | |
| $x^{(4)}$ | 001.111100 | $q_{-5} = +1$ | $q^{(5)} = 1.01011$ |
| $2x^{(4)}$ | 011.111000 | | |
| $-(2 * (1.0101) - 2^{-5})$ | 10.10101 | | |
| $x^{(5)}$ | 001.001110 | $q_{-6} = +1$ | $q^{(6)} = 1.010111$ |
| $2x^{(5)}$ | 010.011100 | | |
| $-(2 * (1.01011) - 2^{-6})$ | 10.101101 | | |
| $X^{(6)}$ | 111.101111 | Negative; Correct | |
| $+(2 * (1.01011) - 2^{-6})$ | 10.101101 | | |
| $X^{(6)}$ corrected | 010.011100 | | |

TABLE 8

The present non-restoring Radix-2 square-rooting process

| | | | |
|---|---|---|---|
| Z | 01.110110 | | |
| $X^{(0)} = z − 1$ | 000.110110 | $q_0 = +1$ | $q^{(0)} = 1.$ |
| $4x^{(0)}$ | 011.011000 | $q_{-1} = +1$ | $q^{(1)} = 1.1$ |
| $-(2 * (1.) + 2^{-1}) +$ $(2 * (1.1) -2^{-2})$ | +101.11 | $q_{-2} = -1$ | $q^{(2)} = 1.01$ |
| $X^{(1)}$ | 001.001000 | $q_{-3} = +1$ | $q^{(3)} = 1.011$ |
| $4x^{(1)}$ | 100.100000 | $q_{-4} = -1$ | $q^{(4)} = 1.0101$ |
| $-(2 * (1.01) + 2^{-3}) +$ $(2 * (1.011) - 2^{-4})$ | +101.0111 | | |
| $x^{(2)}$ | 111.101000 | $q_{-5} = +1$ | $q^{(5)} = 1.01011$ |
| $4x^{(2)}$ | 111.110000 | $q_{-6} = +1$ | $q^{(6)} = 1.010111$ |
| $+(2 * (1.0101) - 2^{-5}) +$ $(2 * (01011) - 2^{-6})$ | 10.1011 | | |
| $x^{(3)}$ | 001.111100 | | |
| $+(2 * (1.01011) - 2^{-6})$ | 10.101101 | | |
| $x^{(6)}$ corrected | 010.011100 | | |

The conventional Radix-2 SRT square-rooting arithmetic process, as shown in Table 7, determines each root digit in accordance with the relation with the partial remainders during each iterative operation, and then the settled root digit is put into the calculating process for the next partial remainder. Therefore, the conventional process needs a plurality of iterative operation cycles with the same number of that of the floating-point digits (whole bits+fraction bits).

On the other hand, in the proposed square-rooting arithmetic process, as shown in Table 8, the root digits $q_0$ and $q_{-1}$ are obtained from the initiative partial remainder $x_{(0)}$ and the root digit prediction table (RPT) establishes $q_{-2}$ with reference to the $q_0$ and $q_{-1}$ (consider that the conventional gets the $q_{-2}$ in the second iterative operation). And then, the first partial remainder $x_{(1)}$ arises from $q_0$, $q_{-1}$, and $q_{-2}$. In the second iterative operation, $x^{(1)}$ produces $q_{-3}$ that is referred by the root prediction table RPT to settle $q_{-4}$ (consider that the conventional gets the $q_{-4}$ in the fourth iterative operation). Next, the second partial remainder $x_{(2)}$ is generated by means of the digits $q_{-3}$ and $q_{-4}$. In the third iterative operation, $x_{(2)}$ produces $q_{-5}$ that is referred by the root prediction table RPT to settle $q_{-6}$ (consider that the conventional gets the $q_{-6}$ in the sixth iterative operation). Next, the second partial remainder $x_{(3)}$ is generated by means of the digits $q_{-5}$ and $q_{-6}$.

As stated above, the present Radix-2 square-rooting arithmetic process can proceed without executing the iterative operation steps for obtaining the first, the third, and the partial remainders, $x^{(1)}$, $x^{(3)}$, and $x^{(5)}$, in order. Therefore, the latency of the present process downs to a half of the conventional. More considering the processing time of the present is the same with that of the conventional, the square-rooting operation of the invention can be conductive faster than the conventional case.

FIG. 1 contains a block diagram of a division/square-rooting arithmetic apparatus 1 in accordance with an embodiment of the invention. The apparatus includes a controller 10, a divisor register 12, quotient/root registers 14, 20, and 46, remainder registers 16 and 48, quotient/root digit selector 18, multiplexers 22, 24, 36, and 44, correction term generators 26, 28, and 30, subtractors 32 and 34, a carry propagation detector 38, and quotient/root digit prediction blocks 40 and 42.

The controller 10 supplies clock signals CLKs and control signals to conduct division and square-rooting operations. The divisor register 12 stores the divisor d for the division operation. The register 14 stores the (i−2)'th quotient digit $q_{-(i-2)}$ or the (i−2)'th partial square root $q^{-(i-2)}$ containing the (i−2)'th root digit $q_{-(i-2)}$. The register 16 stores the (i−2)'th partial remainder $x^{(i-2)}$. The quotient/root digit selector 18 designates the (i−1)'th quotient digit $q_{-(i-1)}$ by means of the (i−2)'th partial remainder $x^{(i-2)}$. The register 20 stores the (i−1)'th quotient digit $q_{-(i-1)}$ or the (i−1)'th partial square root $q^{-(i-1)}$ containing the (i−1)'th root digit $q_{-(i-1)}$.

The multiplexer 22 applies an alternative one of the contents of the divisor register 12 and the quotient/root register 14, i.e., the divisor d and the quotient digit $q_{-(i-2)}$ or the (i−2)'th partial square root $q^{-(i-2)}$ containing the (i−2)'th root digit $q_{-(i-2)}$, to the correction term generator 26. The multiplexer 24 provides an alternative one of the contents of the divisor register 12 and the quotient/root register 20, i.e., the divisor d and the quotient digit $q_{-(i-1)}$ or the (i−1)'th partial square root $q^{-(i-1)}$ containing the (i−1)'th root digit $q_{-(i-1)}$, to the correction term generators 28 and 30. The multiplexers 22 and 24 apply the divisor d to the correction term generators 26, 28, and 30 from the divisor register 12 during the division. While, during the square-rooting operation, the multiplexer 22 applies the (i−2)'th partial square root $q^{-(i-2)}$ to the correction term generator 26, and the multiplexer 24 applies the (i−1)'th partial square root $q^{-(i-1)}$ to the correction term generators 28 and 30.

The correction term generator 26 creates the (i−2)'th correction term, while the correction term generators 28 and 30 create the (i−1)'th correction terms. In particular, the correction term generator 28 forms the (i−1)'th correction term in the condition of the i'th quotient/root digit $q_{-1}=1$, while the correction term generator 30 forms the (i−1)'th correction term in the condition of the i'th quotient/root digit $q_{-1}=-1$. All the correction term generators 26, 28, and 30 make their corresponding correction terms simultaneously. An output of the correction term generator 26 is applied to both the subtractors 32 and 34, and outputs of the correction term generators 28 and 30 are applied to the is subtractors 32 and 34, respectively.

The subtractors 32 and 34 receive the contents of the register 16, i.e., $x^{(i-2)}$. The subtractor 32 deducts the output of the correction term generator 26 and/or the output of the correction term generator 28 from the level-shifted value of the (i−2)'th partial remainder $x^{(i-2)}$, $4x^{(i-2)}$. Similarly, the subtractor 34 deducts the output of the correction term generator 26 and/or the output of the correction term generator 30 from the level-shifted value of the (i−2)'th partial remainder $x^{(i-2)}$, $4x^{(i-2)}$. The subtractor 32 deducts the output of the correction term generator 28 from the level-shifted value of the (i−2)'th partial remainder $x^{(i-2)}$, $4x^{(i-2)}$ during the division and deducts the outputs of the correction term generators 26 and 28 from the level-shifted value of the (i−2)'th partial remainder $x^{(i-2)}$, $4x^{(i-2)}$ during the square-rooting. The subtractor 34 deducts the output of the correction term generator 30 from the level-shifted value of the (i−2)'th partial remainder $x^{(i-2)}$, $4x^{(i-2)}$ during the division and deducts the outputs of the correction term generators 26 and 30 from the level-shifted value of the (i−2)'th partial remainder $x^{(i-2)}$, $4x^{(i-2)}$ during the square-rooting. The outputs from the subtractors 32 and 34 are applied to the multiplexer 36.

The carry propagation detector 38 determines whether there is a borrow or a carry-in during the calculation step for the (i−1)'th partial remainder $x^{(i-1)}$ from the (i−2)'th correction term. Techniques for detecting whether a carry at a given bit position has been generated, propagated, or annihilated (or absorbed) are known.

The quotient/root digit prediction block 40 contains the i'th quotient/root digits when the borrow or the carry-in occurs as shown in Tables 1, 2, 5, and 6 (i.e., borrow/carry-in=1). The quotient/root digit prediction block 42 contains the i'th quotient/root digits when the borrow or the carry-in does not occur as shown in Tables 1, 2, 5, and 6 (i.e., borrow/carry-in=−1). The quotient/root digit prediction blocks 40 and 42 receive the contents of the registers 16 and 20, i.e., $x^{(i-2)}$ and $q_{-(i-1)}$.

The quotient/root digit prediction block 40 predicts the i'th conditional quotient/root digit q1 (i.e., the i'th quotient/root digit in the case of borrow/carry-in=1) corresponding to the content of the register 16, i.e., $x^{(i-2)}$ and the content of the register 20, i.e., $q_{-(i-1)}$. The quotient/root digit prediction block 42 predicts the i'th conditional quotient/root digit q2 (i.e., the i'th quotient/root digit in the case of borrow/carry-in=0) corresponding to the content of the register 16, i.e., $x^{(i-2)}$, and the content of the register 20, i.e., $q_{-(i-1)}$.

Outputs of the quotient/root digit prediction blocks 40 and 42, q1 and q2, are applied to the multiplexer 44. The multiplexer 44 selects an alternative one of the outputs q1 and q2 as the i'th quotient/root digit $q_{-i}$ in response to the output of the carry propagation detector 38.

The i'th quotient/root digit $q_{-i}$ is stored in the register 46, simultaneously being applied to the multiplexer 36. The multiplexer 36 selects an alternative one of the outputs of the subtractors, q1 and q2, as the (i−1)'th partial remainder $x^{(i)}$ in response to i'th quotient/root digit $q_{-i}$, which is stored in the register 48.

As described above, the present Radix-2 arithmetic process does not need iterative operation steps for obtaining the (i−1)'th partial remainder because the (i−1)'th correction term necessary to the calculation of the (i−1)'th partial remainder is generated with the (i−2)'th correction term simultaneously. Hence, the overall iterative operation time is reduced to a half of the convention case, and its delay times do not lengthen thereof. Moreover, the proposed arithmetic apparatus shares the correction term generators and the functional blocks for calculating the division and square-rooting operations, rendering a small area overhead for itself.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus generating a quotient by dividing a dividend with a divisor, the apparatus comprising:
   a first correction term generator for creating a first correction term;
   a second correction term generator for creating a second correction term;
   a first subtractor for deducting the first correction term from a left-shifted value of an (i−2)'th partial remainder;
   a second subtractor for deducting the second correction term from the left-shifted value of the (i−2)'th partial remainder;
   a carry propagation detector for determining whether there is a borrow while calculating an (i−1)'th partial remainder;
   quotient digit prediction means for predicting an i'th quotient digit in response to an (i−1)'th quotient digit, the (i−2)'th partial remainder, and an output of the carry propagation detector; and
   selection means for selecting an alternative one of outputs of the first and second subtractors as an i'th partial remainder in response to the i'th quotient digit.

2. The apparatus according to claim 1, wherein the first correction term is a conditional correction term when the i'th quotient digit is +1, and the second correction term is a conditional correction term when the i'th quotient digit is −1.

3. The apparatus according to claim 1, wherein the quotient digit prediction means comprises:
   a first quotient prediction block for predicting a first quotient digit in response to the (i−1)'th quotient digit and the (i−2)'th partial remainder;
   a second quotient prediction block for predicting a second quotient digit in response to the (i−1)'th quotient digit and the (i−2)'th partial remainder; and
   a multiplexer for selecting an alternative one of the first and second quotient digits as the i'th quotient digit in response to the output of the carry propagation detector.

4. The apparatus according to claim 3, wherein the first quotient digit is a conditional quotient digit at a presence of a borrow, and the second quotient digit is a conditional quotient digit at an absence of a borrow.

5. The apparatus according to claim 1, wherein the apparatus is associated with a floating point.

6. An apparatus generating a quotient (q) by dividing a dividend (x) with a divisor (d), the apparatus comprising:
   an iterative division circuit for operating a partial remainder involved in $x^{(i)}=4x^{(i-2)}-(2q_{-(i-1)}+q_{-i})*d$, where $x^{(i)}$ is an i'th partial remainder, $x^{(i-2)}$ is an (i−2)'th partial remainder, $q_{-(i-1)}$ is an (i−1)'th quotient digit, $x^{(0)}=x$, and $q_{-i} \in \{-1, 0, +1\}$;
   a quotient digit selector for selecting the (i−1)'th quotient digit from the (i−2)'th partial remainder;
   a carry propagation detector for checking a presence of a borrow while calculating an (i−1)'th partial remainder; and
   a quotient digit prediction block for predicting an i'th quotient digit in response to the (i−1)'th quotient digit, the (i−2)'th partial remainder, and an output of the carry propagation detector.

7. The apparatus according to claim 6, further comprising a circuit for calculating the i'th partial remainder by means of the (i−2)'th partial remainder, the (i−1)'th quotient digit, and the predicted quotient digit.

8. The apparatus according to claim 6, wherein the apparatus is associated with a floating point.

9. The apparatus according to claim 6, further comprising a storage circuit for storing the (i−1)'th quotient digit, the (i−2)'th partial remainder, the i'th quotient digit, and the i'th partial remainder.

10. A method of providing a quotient (q) by dividing a dividend (x) with a divisor (d), using an iterative operation for a partial remainder represented by $x^{(i)}=4x^{(i-2)}-(2q_{-(i-1)}+q_{-i})*d$, where $x^{(i)}$ is an i'th partial remainder, $x^{(i-2)}$ is an (i−2)'th partial remainder, $q_{-(i-1)}$ is an (i−1)'th quotient digit, $x^{(0)}=x$, and $q_{-i} \in \{-1, 0, +1\}$, the method comprising the steps of:
   using a quotient digit selecting circuit for selecting the (i−1)'th quotient digit $q_{-(i-1)}$ from the (i−2)'th partial remainder $x^{(i-2)}$;
   using a carry propagation detecting circuit for detecting a presence of a borrow while calculating an (i−1)'th partial remainder;
   using a quotient digit predicting circuit for predicting an i'th quotient digit with reference to the (i−1)'th quotient digit, the (i−2)'th partial remainder, and the a presence of the borrow, without calculating the (i−1)'th partial remainder, and calculating the i'th partial remainder by means of the i'th quotient digit; and
   repeating the former steps to calculate the quotient (q).

* * * * *